Feb. 7, 1961 M. A. CHAPPEY ET AL 2,971,140
TWO-TERMINAL SEMI-CONDUCTOR DEVICES HAVING
NEGATIVE DIFFERENTIAL RESISTANCE
Filed Dec. 21, 1959 4 Sheets-Sheet 1

INVENTORS
MARC A. CHAPPEY AND JACQUES H. LANTIERI

BY Abraham A. Saffitz
ATTORNEY

INVENTORS
MARC. A. CHAPPEY AND JACQUES H. LANTIERI
BY Abraham A. Saffitz
ATTORNEY INVENTORS
MARC A SHAPPEY AND JACQUES H LANTIERI
BY Abraham A. Saffitz
ATTORNEY INVENTORS
MARC A CHAPPEY AND JACQUES H. LANTIERI
BY Abraham A. Saffitz
ATTORNEY United States Patent Office 2,971,140

Patented Feb. 7, 1961

2,971,140

TWO-TERMINAL SEMI-CONDUCTOR DEVICES HAVING NEGATIVE DIFFERENTIAL RESISTANCE

Marc A. Chappey, Neuilly-sur-Seine, and Jacques H. Lantieri, Meudon, France

Filed Dec. 21, 1959, Ser. No. 860,837

Claims priority, application France Jan. 7, 1959

5 Claims. (Cl. 317—235)

The present invention is concerned with two-terminal semi-conductor devices having negative differential resistance and more particularly, a device of this kind constituted by a field-effect semi-conducting structure.

Several types of two-terminal semi-conductor devices having negative differential resistance are known. Some are formed by connecting two junction transistors of standard type but of opposite kinds, that is to say one N-P-N and the other P-N-P, together and to two passive elements. In particular, such devices are described in the U.S. Patent 2,655,609, granted October 13, 1953, to William Shockley for "Bistable Circuits Containing Transistors."

On the other hand, negative resistance devices using special transistors called "P-N-P-N transistors" are known, particularly from the article by Moll, Tanenbaum, Goldey and Holonyak ("P-N-P-N Transistor Switches," Proceedings of the Institute of Radio Engineers, vol. 44, September 1956, pages 1174 to 1182) and the article of J. J. Ebers ("Four-terminal P-N-P-N Transistors," Proceedings of the Institute of Radio Engineers, vol. 40, November 1952, pages 1361 to 1364). In these transistors, use is made of the phenomena of injection of carriers across a potential barrier layer and the displacement of these carriers in regions in which they are minority carriers and in which they are subjected mainly to diffusion forces. Semi-conductor devices are also known comprising a P-I-N structure utilizing the phenomena of transit of carriers across the intrinsic region of the semi-conductor body. Such devices are described, for example, in the article by W. Shockley published in the American periodical "Bell System Technical Journal," July 1954, pages 799 to 826, and entitled "Negative Resistance Arising From Transit Time in Semi-conductor Diodes."

Finally, semi-conductor devices having negative differential resistance utilizing field-effect structures have been proposed. Dacey and Ross in the article entitled "The Field Effect Transistor," published in the periodical "Bell System Technical Journal," volume 39, November 1955, No. 6, pages 1157–1158, and the United States Patent No. 2,825,822 of March 4, 1958, for "Transistor Switching Circuits," describe a negative resistance comprising a field-effect transistor provided with an electrode known as an "Injection" electrode, that is to say that the flux of carriers, circulating between the said electrode and the semi-conductor body on which the said electrode is fixed, is not solely constituted by majority carriers, but equally by an appreciable number of minority carriers.

The device according to the invention combines in a single semi-conductor structure two field-effect transistors. It comprises a semi-conductor body of appropriate form having one part of N conductivity and one part of P conductivity and two ohmic electrodes which are the two terminals of the device, the device comprising also two electric barrier layers each having a region of space charges which can modulate the resistance of one channel. From one terminal to the other, the electric current has available two possible paths, one starting from the first terminal, following a first channel, meeting the second barrier layer and arriving at the second terminal; the other starting from the first terminal, following a second channel, meeting the first barrier layer and arriving at the second terminal. The space charge of the first channel is created by the first barrier layer and the space charge of the second channel is created by the second barrier layer.

The invention will be better understood from the following detailed description and the accompanying drawings, in which.

Figure 10:
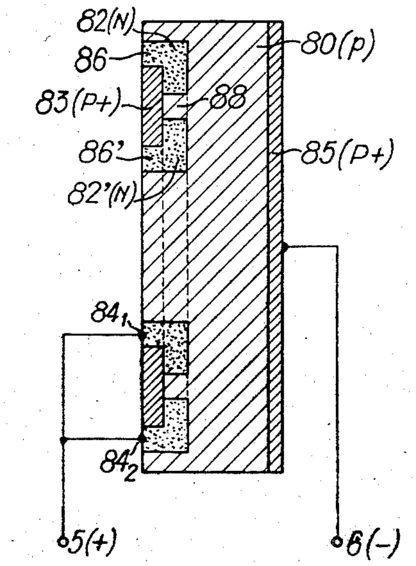

Figure 10 repreesnts a modification of the preceding structure.

Figure 1:
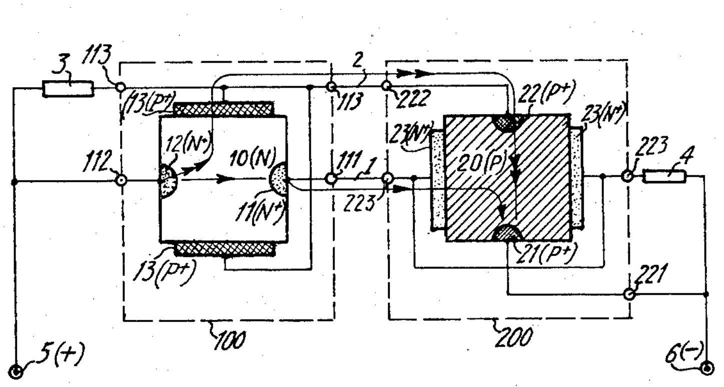
Figure 1 shows a known negative resistance circuit constituted by two field-effect transistors connected to two passive networks.

Referring to Figure 1, which is concerned with the prior art, 100 and 200 represent two field-effect transistors. These field-effect transistors are represented as being of a type described by W. Shockley in his article entitled "A Unipolar Field Effect Transistor," which appeared in the periodical "Proceedings of the Institute of Radio Engineers," volume 40, November 1952, pages 1365 to 1376. It will be understood that they could be of some other known type, for example of the type described in the copending application, Serial No. 565,231, filed February 13, 1956.

The field-effect transistor 100 comprises an N-type germanium plate 10 placed between two thin layers 13 of $P^+$ type which constitute the gate. Both ends of this plate are provided with ohmic contacts 11 and 12 of $N^+$ type which constitute respectively the source electrode and the drain electrode of the transistor. The source electrode, the drain electrode and the gate are respectively connected to the terminals 111, 112 and 113.

In a similar manner, the field-effect transistor 200 is constituted by a germanium plate 20 of P type placed between two thin layers 23 of type $N^+$ which form the gate. Both ends of this plate are provided with ohmic contacts 21 and 22 of $P^+$-type which constitute respectively the drain electrode and the source electrode of the transistor. The drain electrode, the source electrode and the gate are respectively connected to terminals 221, 222 and 223. It will be seen that by convention the ohmic electrodes connected respectively to the positive and negative terminals of the current supply source are called the source electrode and the drain electrode of a P-type field-effect transistor, a convention opposite to that chosen for N-type field-effect transistors.

A negative resistance device with two terminals 5—6 may be formed, as may be derived from U.S. Pat. No. 2,655,609 mentioned above by substituting field-effect transistors for the junction-transistors referred to therein by connecting the gate 13 of the first field-effect transistor (or the gate 23 of the other one), to the source electrode 22 of the second transistor (or the drain electrode 11 of the first transistor). In this device it is necessary also to connect the first terminal 5 on the one hand directly to the drain electrode 12 of the first transistor and on the other hand to the gate 13 through a first passive network 3. In the same way the second terminal 6 is connected on the one hand, directly to the drain electrode 21 and on the other hand, to the gate 23 through a second passive network 4. The terminal 5 is the positive terminal of the device and the terminal 6 the negative terminal. This assembly is obtained by means of connections 1, connecting the terminals 111 and 223, and 2, connecting the terminals 222 and 113.

In connection with the passive networks 3 and 4, their characteristic must be such that when the voltage increases between the terminals 5 and 6 of the two-terminal negative resistance device, the voltage drop at the terminals of the network 3 or at the terminals of the network 4 increases less quickly than the voltage drop between the electrodes 11 and 12 and the voltage drop between the electrodes 21 and 22, respectively. The networks 3 and 4 can be constituted, for example, by diodes arranged in their non-conducting direction, and of which the characteristics in the reverse direction are suitably chosen in relation to the inverse characteristics of the junctions formed by the gates of the field-effect transistors. It is possible in certain instances to form the networks 3 and 4 by simple resistances.

It is known that the two-terminal device of Figure 1 comprises two conditions of stable equilibrium characterized as follows:

(1) In the first stable condition, the voltage between the terminals 5 and 6 of the device is small, but the current which passes through it has a relatively large value, by reason of the fact that the positive potential of the terminal 5 is found at the gate 13 as a consequence of the presence of the passive network 3. In the same way, the negative potential of the terminal 6 is found at the gate 23 as a consequence of the presence of the passive network 4. The result is that the junction between the gate 13 of $P^+$-type and the semi-conductor body 10 of N-type, is polarized, over a certain part of the length of the gate, in the forward direction. In the same way, the junction between the gate 23 of $N^+$-type and the semi-conductor body 20 of P-type is polarized, over a certain part of the length of the gate, in the forward direction.

(2) In the second stable condition, the voltage between the terminals 5 and 6 of the network is large. The two junctions mentioned above in paragraph (1) are polarized in the reverse direction and the result is that the current which passes through the negative resistance device is very small.

To pass from one to the other of the two stable conditions, it is necessary that the operating point which describes the "current-voltage" characteristic of the device passes through the part of the characteristic having negative resistance, that is to say the part where the voltage and the current vary in inverse direction.

As has been already stated, the semi-conductor device of the invention unites in a single structure the two field-effect transistors of Figure 1.

Figures 2, 3:
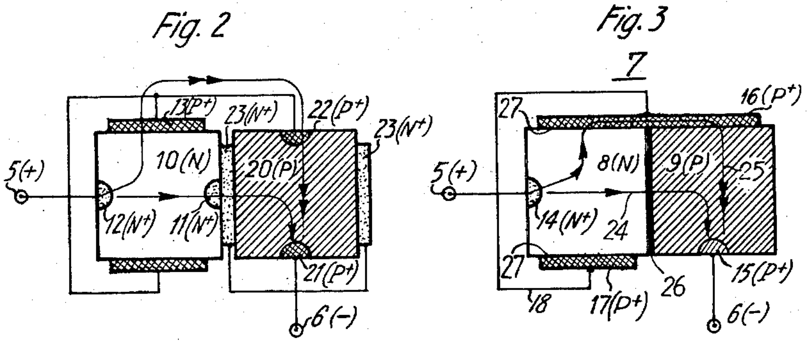
Figure 2 is a theoretical diagram explaining the way in which a single negative-resistance structure can be deduced from Figure 1.
Figure 3 represents a structure according to the invention.

To show how a change is made from the two transistors of Figure 1 to the single-structure device of Figure 3, a substantially square cross-section has been given to the field-effect transistors 100 and 200 and the two transistors have been represented respectively in positions such that the electron channel joining the electrodes 11 and 12 in the N-type region and the holes channel joining the electrodes 21 and 22 in the P-type region will be perpendicular to one another. Let the two transistors be brought near to one another as is shown in Figure 2. Examination of this figure shows that:

(*a*) The source electrode 11 and the connection 1 can be eliminated;

(*b*) The gate 23 on the left can be eliminated;

(*c*) The source electrode 22 and the connection 2 can be removed by extending the upper gate 13 above the P-type body 20;

(*d*) The gate 23 on the right is not essential for the formation of a channel in the body 20 and can, therefore, be removed;

(*e*) The passive networks 3 and 4 serving to fix the potential of the gates are no longer necessary.

The resulting negative resistance semi-conductor device is shown in Figure 3. It comprises a junction semi-conductor structure 7 including a part 8 of N-type and a part 9 of P-type. Two ohmic electrodes 14 and 15 are placed respectively on the left-hand face of the part 8 and on the lower surface of the part 9. Two $P^+$-type layers 16 and 17 are formed on the upper and lower parts of the structure; one layer 16 extends over both the P-type region and the N-type region, the other layer 17 only over the N-type region. These two $P^+$-type layers are joined by a connection 18. The electrodes 14 and 15 are connected to the terminals 5 and 6 of the device.

The two paths 24 and 25 are shown in Figure 3. It will be seen that the junction 26 between the zones 8 and 9 is in the course of the first path, and the junction 27 between the $P^+$-type layer and the zone 8 is in the course of the second. It will be seen that the channel 24 is modulated by the space charge created by the barrier layer 27 and that the channel 25 is modulated by the space charge created by the barrier layer 26.

The structure of Figure 3 is difficult to put into practice. Other more easily manufactured structures will now be described.

Figure 4:
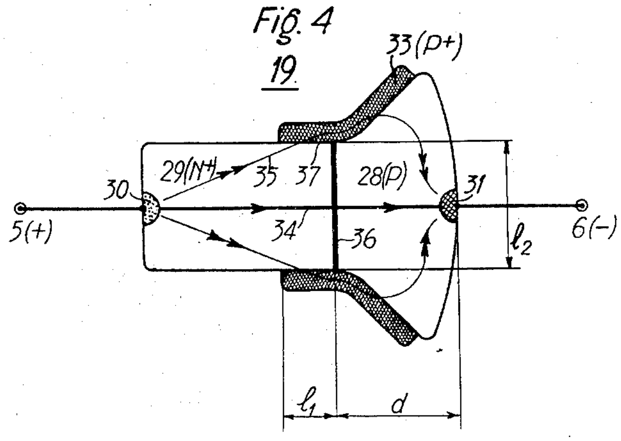
Figures 4, 5, 6, 7 and 8 represent modifications of the structure according to the invention.

The structure 10 of Figure 4 comprises a P-type part 28 of generally truncated form and an $N^+$-type part 29 of generally cylindrical form. The terminals 5 and 6 are connected respectively to the two ohmic electrodes 30 and 31, the first in contact with the $N^+$-type part, the second in contact with the P-type part. The two parts $N^+$ and P form a junction 36 at their common face. A heavily doped coating 33 of $P^+$-type covers the lateral wall of the assembly on both sides of the junction 36. This coating forms, with the part 29 of $N^+$-type, a second junction 37. The conductive channels have been shown at 34 and 35. They provide, with respect to the junctions 36 and 37, an arrangement which is similar to that of the conductive channels 24 and 25 with respect to the junctions 26 and 27.

The structure 19 of Figure 4 can be made in the following manner:

In a germanium plate, obtained for example by pulling process and containing an N-P-junction (resistivity of the N-type part one ohm-cm. for example), a cylindrical bar of which the diameter is of the order of 200 microns is cut out, across the junction, using an ultrasonic generator. By an electrolytic dissolving process in an etching bath, the diameter is selectively reduced to a few tens of microns in the N-type region adjoining the junction, according to a process already described in the French Patent No. 1,182,731 of September 13, 1957, for "Crystal Transistors and Tetrodes Having Emitter-Base Diodes of High Quality, and Their Process of Manufacture." The $P^+$-type coating is obtained by electrolytic deposition in a bath of a suitable salt (indium sulphate for example), which may be followed by an alloying. This $P^+$-type coating can also be obtained by metallisation under vacuum, alloying or diffusion, following the standard techniques in the semi-conductor art. The lengths $l_1$ and $l_2$ of the channels in a specimen structure constructed by the applicants, are of the order of 50 microns. The thickness $d$ of the P-type region is also a few tens of microns.

A similar structure can also be made, although with greater technical difficulties, by permuting the N-type and P-type regions, and by replacing the $P^+$-type coating by an $N^+$-type coating.

Figure 5:
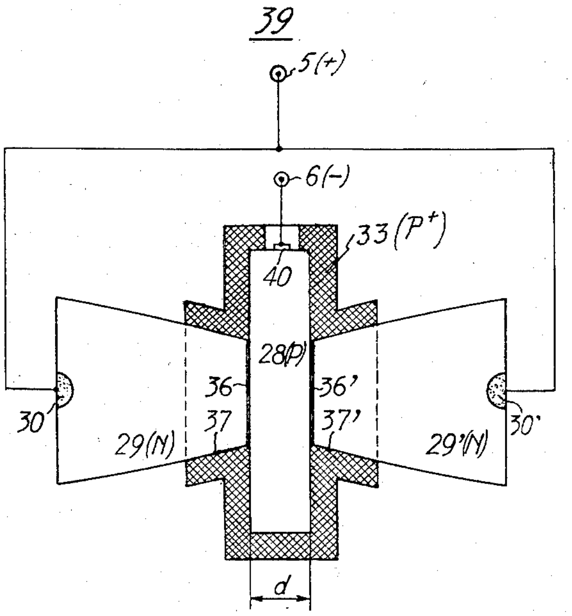

Figure 5 shows a structure 39 which is obtained from that of Figure 4 by symmetry with respect to the diametral median plane of the part 28. The reference numerals have the same significance as in Figure 4, the parts which are duplicated having primed numbers. The ohmic electrode of the P-type part which can no longer be placed on the end face of the said part is formed on the lateral face at 40, in a part which is not covered by the $P^+$-type coating 33.

The advantage over the preceding structure is to allow the production of a thin P-type region having a thickness *d* of 10 to 20 microns, for example by pulling process. The diameter of the part 28 is of the order of several hundred microns.

Figure 6:
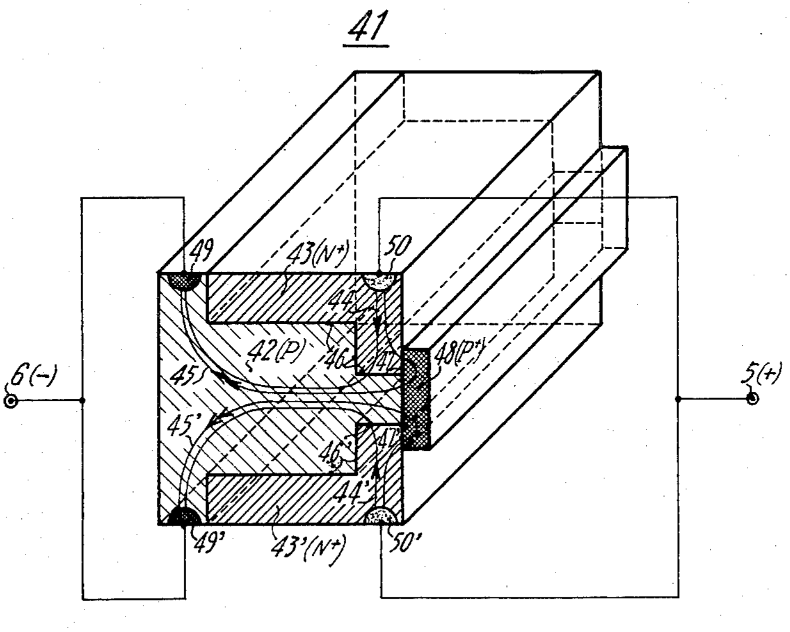

Figure 6 shows a structure 41 comprising a block of P-type silicon which has been doped by the diffusion of donor impurities across certain parts of its surface in such a way as to obtain a core 42 of P-type the width of which decreases in two steps, and two parts 43 and 43' of $N^+$-type in the form of angle members. A zone 48 of $P^+$-type is in contact on the one hand with the two portions 43 and 43' of $N^+$-type and on the other hand with the core of P-type at the position of minimum width. The structure described contains four junctions 46, 46', 47, 47' between the regions 42 and (43—43'), and (43—43') and 48, respectively. The conductive channels have been shown at 44 and 45. The ohmic electrodes are numbered 49—49' for the P-type part and 50—50' for the $N^+$-type part.

Figure 7:
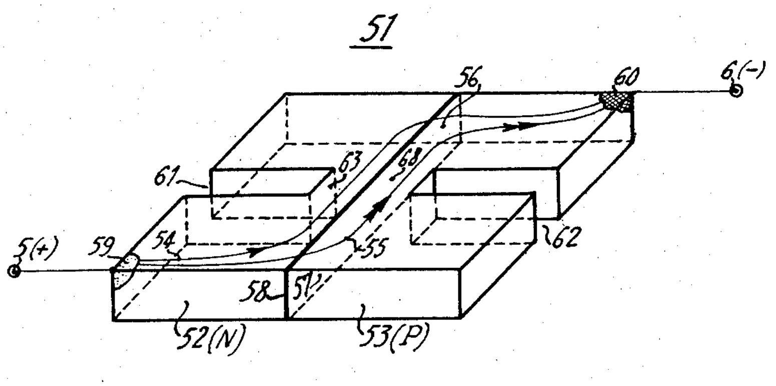

Figure 7 represents another structure 51 of generally parallelepiped form comprising a P-type semi-conductor part 52 and an N-type semi-conductor part 53 forming an N-P junction 58. The ohmic electrodes 59 and 60, one in contact with the N-type region, and the other with the P-type region, are connected to terminals 5 and 6 respectively. A slot 61 is cut in the zone 52, and a slot 62 is cut in the zone 53, these slots defining with the junction 58 the thinned parts 63 and 68 respectively. The first path comprises the first ohmic contact 59 connected to the positive terminal 5, the channel 63 in N-type region controlled by the junction 58, and crosses the back part of this junction at 56 before ending at the second ohmic contact 60 connected to the negative terminal 6 of the device. The second path leaves the first ohmic contact 59, crosses the front part of the junction 58 at 57, follows the channel 68 in P-type region, controlled by the junction 58 and finally, terminates at the second ohmic contact 60. Thus the front part and the back part of the junction 58 act as two distinct barrier layers, each of which controls the path crossing the other.

The slots 61 and 62 can easily be produced by any known process such as anodic dissolution or by shaping by means of a nozzle projecting an etching electrolyte.

Figure 8:
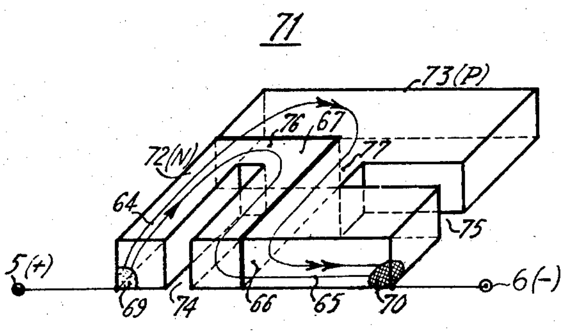

Figure 8 shows a negative resistance semi-conductor structure 71 resembling closely the structure of Figure 7 but less brittle than the latter because the thinned portions where the constriction of the channels is produced, are not opposite one another in this case. The P-type part 73 is in the form of an angle member and the N-type part 72 is in the form of a parallelepiped filling the hollow of the angle, the assembly having the form of a parallelepiped. The structure is obtained by pulling an N-P junction from a molten bath, cutting a bar in this junction and diffusing acceptor elements on the rear face of the bar. Thus is obtained a junction 66—67 which has two faces at right-angles. Slots 74 and 75, having mutually perpendicular directions, are hollowed in the zones 72 of N type and 73 of P type, the slot 74 together with the part 67 of the junction defining a narrowed portion 76 and the slot 75 together with the portion 66 of the junction defining a narrowed portion 77.

The first path 65 starts from the ohmic contact 69 and takes the channel 76 in the N-type region before crossing the junction at 66 and terminating at the ohmic contact 70.

The second path 64, starting from the same ohmic contact 69, crosses the junction at 67 and follows the channel 77 in the P-type region before arriving at the ohmic contact 70.

Figure 9:
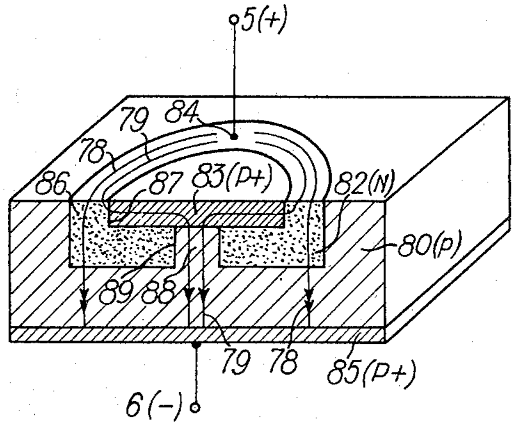
Figure 9 represents a structure according to the invention constructed in a plane semi-conductor plate and in which the junctions are annular.

The structure shown in Figure 9 is constituted by a circular or square lightly doped P-type silicon plate 80 including an annular N-type electrode 82. This electrode 82 which is L-shaped in cross-section, i.e. the radial width of the annular electrode is smaller on and near the surface than in the depth of the plate is obtained by selective diffusion of phosphor in the following manner:

The plate 80 is placed in an oven at a temperature of 1300° C. in a current of oxygen. The silica coating thus formed on its surface is then covered with wax with the exception of a ring occupying the maximum surface for the electrode 82, and the plate 80 is immersed in hydrofluoric acid, in which the silica which is not covered with wax is dissolved. Then, the wax having been removed, the electrode 82 is formed by phosphor diffusion, the remainder of the plate 80 being protected by the silica which covers it. This is in its turn dissolved in the hydrofluoric acid. The annular electrode thus obtained forms an N-type region which reaches to a predetermined depth in the plate 80 and is fairly strongly doped, especially in the vicinity of the surface. But this annular electrode is too large near the surface and its radial width is to be decreased thereon.

A layer of aluminium covering all the surface within the annular electrode 82 and the interior part of this latter is then deposited, by vacuum evaporation, on the central part of the surface of the plate 80 comprising the annular electrode 82. The plate 80 is then placed in an oven where it is brought to a temperature sufficient to form two superposed layers of alloy on the site of the metallic deposit. The bottom layer is a recrystallized region, constituted of $P^+$ type silicon heavily doped with aluminium. The thickness of the aluminium deposit and the temperature of the oven are regulated in such a way that the recrystallized region penetrates into the plate 80 to a depth less than the annular electrode 82. The superficial layer, which is the normal eutectic of aluminium and silicon, having been removed by dissolution in a bath of hydrofluoric acid, there is thus obtained a cylindrical region of $P^+$ type disposed as is shown in Figure 9. Ohmic electrodes 84 and 85, one in contact with the N-type region and the other with the P-type region, are respectively connected to the terminals 5 and 6. It is seen that a first path 78, which starts from the positive terminal 5, includes the ohmic contact 84 and the channel 86 modulated by the barrier layer 87, then crosses the N-P junction to end at the $P^+$-type coating 85 and the terminal 6; and that a second path 79 which also starts from the terminal 5 and the ohmic contact 84, crosses the N-$P^+$ junction at 87 and then passes through the channel 88 modulated by the barrier layer 89 to end at the $P^+$-type coating and the terminal 6. It should be noted that the channels 86 and 88 are perpendicular to the surfaces of the plate 80 and that their length is determined by the respective thicknesses of the layers 83 and 82.

In the structure shown in Figure 10 and which is a variation of the preceding figure, the annular electrode 82 of Figure 9 has been replaced by two concentric annular electrodes 82 and 82' which are connected together and to the terminal 5 by ohmic contact connections $84_1$ and $84_2$. In the same way, the region 83 of $P^+$ type has taken the form of an annular ring included between the electrodes 82 and 82'. It will be seen that the channel 88 has thus become annular and that the annular channel 86 of Figure 9 has been replaced by two concentric annular channels 86 and 86'.

The processes of manufacture of this structure are the same as those for the structure shown in Figure 9.

It will be noted that the structures represented in Figures 9 and 10 allow the modulation of one of the channels by an external source and thus the achievement of amplitude modulation. For this it is sufficient to provide the $P^+$-type region 83 with an ohmic contact and to apply between this and the terminal 5 an alternating modulation voltage while the alternating voltage to be modulated is applied between the terminals 5 and 6.

Other single semi-conductor structures comprising an N-type region and a P-type region, two ohmic electrodes situated respectively in each of these regions, two electric barrier layers constituted by junctions or rectifying contacts, and means for producing two channels, one for electron carriers in the N-type region and the other for hole carriers in the P-type region, the said channels being controlled by one of the barrier layers and polarizing the other, can be designed by a man skilled in the art and will come within the scope of the invention.

We claim:

1. A two-terminal negative differential resistance device consisting of a semi-conductor body comprising two ohmic contact electrodes connected to the terminals of the device, two electric barrier layers and two conductive channels between said terminals, each of the said channels crossing one of the electric barrier layers and polarizing the other.

2. A two-terminal negative differential resistance device consisting of a semi-conductor comprising a first region of a given type of conductivity having an ohmic contact connected to one of the terminals of the device, a second region of the opposite type of conductivity having an ohmic contact connected to the other terminal of the device, a first junction between the said first and second regions, a layer heavily doped in the same conductivity-type as the second region covering the junction and the parts of the said first and second regions close to the junction to the exclusion of their ohmic contacts, the said layer forming a second junction with the part of the first region which it covers, and two conductive channels between the said ohmic contacts, each of the said channels crossing one of the said junctions and polarizing the other.

3. A two-terminal negative differential resistance device consisting of a semi-conductor body comprising an N-type region having an ohmic contact connected to one of the terminals of the device, a P-type region having an ohmic contact connected to the other terminal of the device, a junction between the N-type region and the P-type region, a heavily doped $P^+$-type layer covering the junction and the parts of the N-type and P-type regions close to the junction to the exclusion of their ohmic contacts, and said $P^+$-type layer forming a junction with the part of the N-type region which it covers, two conductive channels between the said ohmic contacts, the first channel crossing the junction between the N-type and P-type regions and polarizing the junction between the N-type region and the $P^+$-type layer and the second channel crossing the junction between the N-type region and the $P^+$-type layer and polarizing the junction between the N-type region and the P-type region.

4. A two-terminal negative differential resistance device consisting of a plate of a semi-conductor body comprising an N-type region having an ohmic contact connected to one of the terminals of the device, a P-type region having an ohmic contact connected to the other terminal of the device, a junction between the N-type region and the P-type region, two converging slots, one in the N-type region and the other in the P-type region, cutting the semi-conductive plate over its whole thickness in the direction of and to the vicinity of the said junction so as to form along the length of the median part of the junction a constriction consisting of a small section of each of the said regions, and two conductive channels between the said ohmic contacts, these two channels passing through the constriction parallel to one another, one in the N-type region and the other in the P-type region, and each of these channels crossing the electric barrier layer constituted be the part of the junction situated on one side of the said constriction and polarizing the electric barrier layer constituted by the part of the junction situated on the other side of the said constriction.

5. A two-terminal negative differential resistance device consisting of a plate of a P-type semi-conductor material comprising on one of its faces an ohmic contact of large surface area connected to one of the terminals of the device, on the opposite face an N-type region of a given thickness and of annular form separated from the remainder of the semi-conductor body by a first junction and comprising an ohmic contact connected to the other terminal of the device and a heavily doped cylindrical $P^+$-type region concentric with the N-type region and of smaller thickness covering a central ring of the N-type region with which it forms a second junction and the P-type region included within this ring in such a manner that between the said ohmic contacts exist a first conductive channel which crosses the first junction and polarizes the second junction and a second conductive channel which crosses the second junction and polarizes the first junction.

References Cited in the file of this patent

UNITED STATES PATENTS

| | | |
|---|---|---|
| 2,754,431 | Johnson | July 10, 1956 |
| 2,814,735 | Cody et al. | Nov. 26, 1957 |
| 2,909,453 | Losco et al. | Oct. 20, 1959 |